United States Patent
Rosicky et al.

(10) Patent No.: US 10,899,229 B2
(45) Date of Patent: Jan. 26, 2021

(54) OPERATING SYSTEM WITH THREE-DIMENSIONAL DISPLAY FOR A VEHICLE

(71) Applicant: AUDI AG, Ingolstadt (DE)

(72) Inventors: Vit Rosicky, Frydlant (CZ); Jacques Hélot, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/753,552

(22) PCT Filed: Sep. 20, 2018

(86) PCT No.: PCT/EP2018/075499
§ 371 (c)(1),
(2) Date: Apr. 3, 2020

(87) PCT Pub. No.: WO2019/068479
PCT Pub. Date: Apr. 11, 2019

(65) Prior Publication Data
US 2020/0296355 A1    Sep. 17, 2020

(30) Foreign Application Priority Data
Oct. 4, 2017   (DE) .................. 10 2017 217 591

(51) Int. Cl.
*B60K 37/06*      (2006.01)
*H04N 13/395*    (2018.01)
(Continued)

(52) U.S. Cl.
CPC ............ *B60K 37/06* (2013.01); *G06F 3/0346* (2013.01); *G06F 3/0362* (2013.01); *G06F 3/167* (2013.01);
(Continued)

(58) Field of Classification Search
CPC ...... H04N 13/395; B60K 35/00; B60K 37/06; B60K 2370/11; B60K 2370/111;
(Continued)

(56) References Cited

U.S. PATENT DOCUMENTS 8,890,771 B2 * 11/2014 Pance ................... G06F 1/1647
345/4
10,596,908 B1 * 3/2020 Baek ..................... B60K 37/06
(Continued)

FOREIGN PATENT DOCUMENTS

CN      104685460 A    6/2015
CN      106415666 A    2/2017
(Continued)

OTHER PUBLICATIONS

English Translation of Written Opinion of the International Searching Authority on International Application No. PCT/EP2018/075499, dated Apr. 8, 2020, 6 pages.
(Continued)

*Primary Examiner* — David Tung
(74) *Attorney, Agent, or Firm* — Staas & Halsey LLP

(57) ABSTRACT

An operating system includes a display device having at least two planar display regions, which are arranged one behind the other in a viewing direction of an operator and extend transversely to the viewing direction. The operating system can be used to control a plurality of apparatuses of a vehicle.

18 Claims, 4 Drawing Sheets

(51) Int. Cl.
*G06F 3/16* (2006.01)
*G06F 3/0362* (2013.01)
*G06F 3/0346* (2013.01)

(52) U.S. Cl.
CPC ........ *H04N 13/395* (2018.05); *B60K 2370/11* (2019.05); *B60K 2370/111* (2019.05); *B60K 2370/113* (2019.05); *B60K 2370/115* (2019.05); *B60K 2370/128* (2019.05); *B60K 2370/131* (2019.05); *B60K 2370/133* (2019.05); *B60K 2370/143* (2019.05); *B60K 2370/146* (2019.05); *B60K 2370/1464* (2019.05); *B60K 2370/152* (2019.05); *B60K 2370/1531* (2019.05); *B60K 2370/1533* (2019.05); *B60K 2370/23* (2019.05); *G09G 2300/023* (2013.01); *G09G 2380/02* (2013.01)

(58) Field of Classification Search
CPC ........ B60K 2370/113; B60K 2370/115; B60K 2370/143; B60K 2370/152; B60K 2370/1531; B60K 2370/1533; B60K 2370/128; B60K 2370/131; B60K 2370/133; B60K 2370/146; B60K 2370/1464; B60K 2370/23; B60K 2370/29; B60K 2370/126; B60K 2370/148; B60K 2370/135; B60K 2370/334; B60K 2370/347; B60K 2370/27; G09G 2300/23; G09G 2380/02; G06F 3/167; G06F 3/0202; G06F 3/0227; G06F 3/0346; G06F 3/0362; G06F 3/481; G06F 3/04812; G06F 2203/0381

See application file for complete search history.

(56) References Cited

U.S. PATENT DOCUMENTS

| | | | | |
|---|---|---|---|---|
| 2004/0135741 | A1* | 7/2004 | Tomisawa | H04N 13/398 345/6 |
| 2005/0018172 | A1* | 1/2005 | Gelfond | G06F 3/0489 356/51 |
| 2005/0052341 | A1* | 3/2005 | Henriksson | G09F 9/46 345/4 |
| 2008/0211779 | A1* | 9/2008 | Pryor | G06F 3/04847 345/173 |
| 2009/0132130 | A1* | 5/2009 | Kumon | G01C 21/365 701/49 |
| 2010/0182219 | A1* | 7/2010 | Tomisawa | G02B 30/56 345/4 |
| 2010/0214213 | A1* | 8/2010 | Bowden | B60K 35/00 345/157 |
| 2011/0025488 | A1* | 2/2011 | Leon | F16H 59/08 340/456 |
| 2012/0060089 | A1* | 3/2012 | Heo | G06F 3/1431 715/702 |
| 2013/0033463 | A1* | 2/2013 | Geyl | B60K 35/00 345/184 |
| 2013/0235000 | A1* | 9/2013 | Lee | G06F 3/0362 345/184 |
| 2014/0183011 | A1* | 7/2014 | Park | H01H 25/065 200/4 |
| 2014/0282182 | A1 | 9/2014 | Yamada | |
| 2014/0292695 | A1* | 10/2014 | Wakamoto | B60K 35/00 345/173 |
| 2014/0333663 | A1 | 11/2014 | Yamada et al. | |
| 2014/0359504 | A1* | 12/2014 | Kim | G06F 3/0488 715/768 |
| 2015/0009189 | A1 | 1/2015 | Nagara | |
| 2015/0286288 | A1* | 10/2015 | Lee | G06F 3/016 345/173 |
| 2015/0363070 | A1 | 12/2015 | Katz | |
| 2016/0062618 | A1* | 3/2016 | Fagan | G06F 3/0488 715/772 |
| 2016/0144716 | A1* | 5/2016 | Kim | B60K 35/00 345/184 |
| 2016/0364894 | A1* | 12/2016 | Hosoda | G06F 3/0416 |
| 2017/0052399 | A1* | 2/2017 | Guzman | B60H 1/00985 |
| 2017/0177097 | A1* | 6/2017 | Ding | G05G 1/08 |
| 2018/0181287 | A1* | 6/2018 | O'Brien | G09G 5/14 |
| 2018/0373350 | A1* | 12/2018 | Rao | G06F 3/038 |

FOREIGN PATENT DOCUMENTS

| | | |
|---|---|---|
| DE | 10 2010 028 450 B4 | 2/2012 |
| DE | 10 2014 016 324 A1 | 5/2016 |
| DE | 10 2014 222 751 A1 | 5/2016 |
| DE | 10 2015 011 403 A1 | 3/2017 |
| DE | 10 2017 217 591.5 | 10/2017 |
| DE | 10 2016 216 577 A1 | 3/2018 |
| EP | 0 893 750 B1 | 1/1999 |
| WO | 2014/021658 A1 | 2/2014 |
| WO | 2017/036716 A1 | 3/2017 |
| WO | 2017/087872 A1 | 5/2017 |
| WO | PCT/EP2018/075499 | 9/2018 |

OTHER PUBLICATIONS

International Search Report dated Jan. 7, 2019 from International Application No. PCT/EP2018/075499, 4 pages.

German Office Action dated Jul. 20, 2018 from German Patent Application No. 10 2017 217 591.5, 8 pages.

Chinese Office Action dated Sep. 1, 2020, from Chinese Patent Application No. 201880063975.5.

* cited by examiner

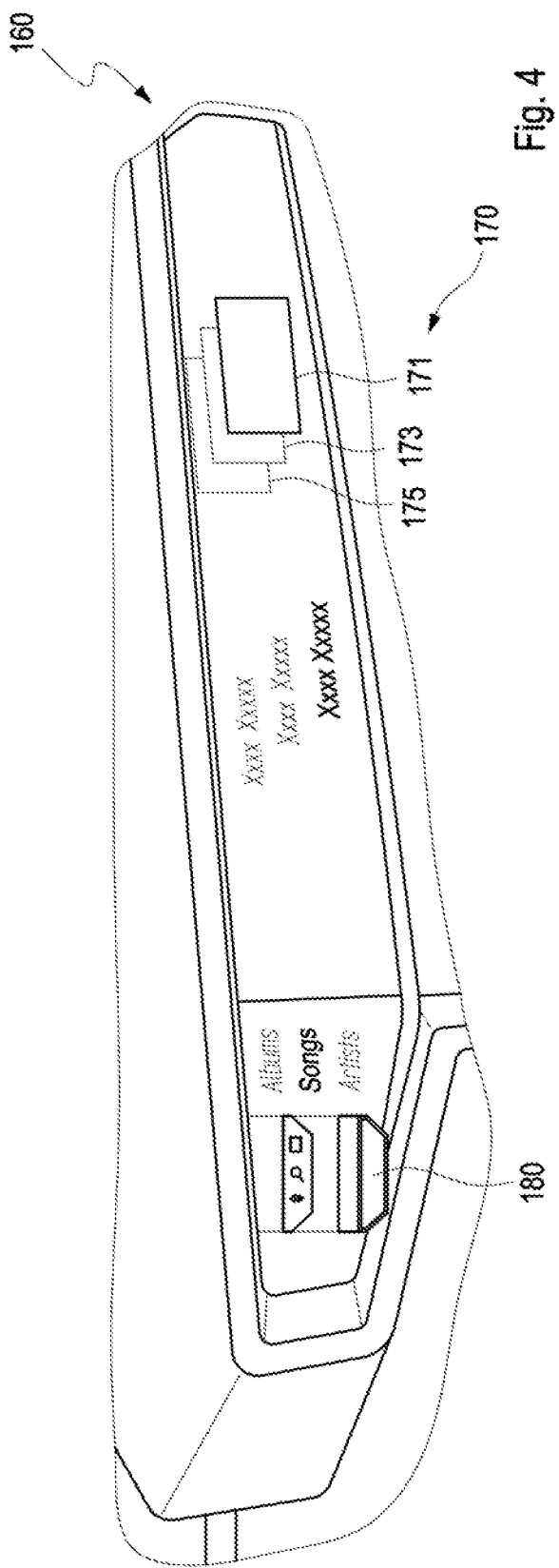
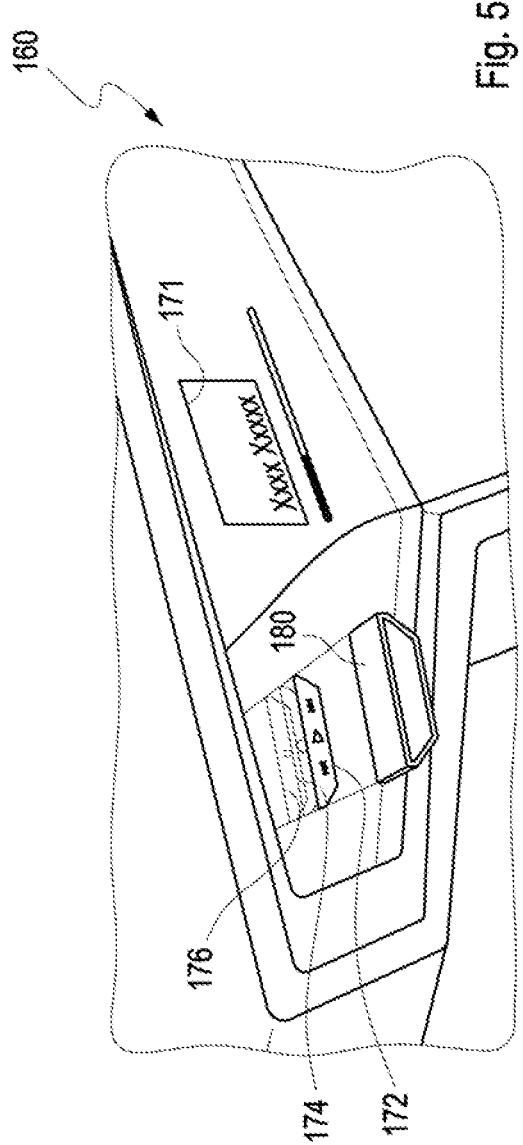

OPERATING SYSTEM WITH THREE-DIMENSIONAL DISPLAY FOR A VEHICLE

CROSS REFERENCE TO RELATED APPLICATIONS

This application is a U.S. national stage of International Application No. PCT/EP2018/075499, filed on Sep. 20, 2018. The International Application claims the priority benefit of German Application No. 10 2017 217 591.5 filed on Oct. 4, 2017. Both International Application No. PCT/EP2018/075499 and German Application No. 10 2017 217 591.5 are incorporated by reference herein in their entirety.

BACKGROUND

Described herein is an operating system for a plurality of apparatuses of a vehicle, which has a display device having at least two planar display regions, which are arranged one behind the other in a viewing direction of an operator and extend transversely to the viewing direction.

Vehicles for road use typically have a multiplicity of different apparatuses, for example an engine, an illumination system, an air-conditioning system, a navigation apparatus or a radio apparatus. The apparatuses can be operated by an occupant of the vehicle, for example by a driver of the vehicle, to change the respective operating states of the apparatuses as desired.

Each operating state of an apparatus is defined by specific variable control variables. These control variables include for example a current acceleration of the engine, a mode of the illumination system such as for example parking lights or high beam, a target temperature of the air-conditioning system, a traffic network map of a navigation apparatus with a route leading to a destination, or volume and channel determination of the radio apparatus. In addition to these control variables, further variables, such as for example a measured external temperature in an environment of the vehicle, can be of interest.

For the appropriate use of a vehicle, a large number of different pieces of information are required accordingly. These pieces of information must be displayed in a field of view of the driver, of the front passenger and/or of another passenger.

In older vehicles, typically every installed apparatus has its own display device. Accordingly, for example the driver of such a vehicle must aim their gaze in many different directions to acquire each necessary piece of information, and, as a result, they may be distracted from traffic events in the environment of the vehicle.

In more recent vehicles, by contrast, apparatus information is increasingly combined and made visible in a common display device. Consequently, a driver of a modern vehicle needs to aim their gaze only in a single direction to acquire required information. Typically, liquid-crystal displays (LCDs) are installed for this purpose as common display devices.

However, developments are geared toward providing vehicles with an increasing number of apparatuses. In addition, the functional variety and consequently the complexity of each individual apparatus that is installed in a vehicle increases, which is why representing different operating states of all apparatuses requires in each case a larger number of pieces of information. The aim is certainly to reduce the number of pieces of information that is being represented. However, it is possible that a display region that is available on a common display device is not sufficient to represent all the information simultaneously and in a clearly understandable manner.

One known possibility of representing a large number of pieces of information even on relatively small display regions is based on a hierarchical organization of the information. In this case, always only pieces of information of one hierarchy plane are represented at the same time on the display area. However, a menu structure is made available for the viewer to allow navigation between the different hierarchy planes.

If the hierarchical organization has a corresponding width and/or depth, the use of such a display device can even then be confusing, because required pieces of information are initially invisible and are displayed only after targeted navigation using the menu structure. Learning a branched menu structure, however, can involve a lot of effort for the viewer. In addition, navigation using the menu structure can likewise distract the viewer from traffic events, which increases the risk of an accident.

A further possibility of making a large number of pieces of information visible for a viewer on a display device is to embody the display device as having a plurality of display regions, rather than one. In order to ensure that the plurality of display regions are nevertheless arranged in the same viewing direction of the viewer, they can be provided one behind the other. So as not to block the view of the viewer onto rearward display regions, frontward display regions must be designed to be transparent. A display device that is formed in this manner makes representation of information in three rather than two spatial dimensions possible, as a result of which a greater multiplicity of pieces of information can be displayed simultaneously.

For example, German Patent Application No. 10 2014 016 324 A1 describes a display device for a vehicle having a screen and two or three mirrors arranged successively in a viewing direction of a viewer. A rearward mirror is opaque and any further frontward mirror is partially transparent. Each mirror forms a display region, which defines a virtual image plane and on which objects represented by the screen are visible for the viewer.

As an alternative, German Patent Application No. 10 2015 011 403 A1 describes a method for displaying data using a bendable display device. The display device is bent such that at least two display regions which are arranged one behind the other in a viewing direction of a viewer are formed. In this way, displayed data can overlay one another and create a depth effect.

U.S. Patent Application Publication No. 2014/0333663 A1 also describes a display device for a vehicle. The display device includes a first display region and one or more further transparent display regions, which are arranged in front of the first display region and entirely or partially overlap the first display region with respect to a viewing direction of a viewer.

The appropriate use of a vehicle also requires, in addition to continuously capturing information, repeated operation of the apparatuses that are typically installed at different positions in the vehicle. By their very nature, most apparatuses of a vehicle are operated by the driver of the vehicle. Consequently, the driver can also be distracted from the traffic events in an environment of the vehicle by operating the apparatuses.

SUMMARY

Described herein is an integrated operating system for a vehicle, the actuation of which requires little attention and makes intuitive and ergonomic operation of apparatuses installed in the vehicle possible.

Described herein is an operating system for a plurality of apparatuses of a vehicle that has a display device. The display device includes at least two planar display regions, which are arranged one behind the other in a viewing direction and extend transversely to the viewing direction. Hereby, the available display area is enlarged as compared to a display device having a single display region, without requiring that the viewer changes their viewing direction. With respect to the viewing direction, any orientation of a planar display region in which the viewing direction does not extend parallel to the planar display region is understood to be a transverse extent. In other words, an angle between the viewing direction and the planar display region can be a right angle or an acute angle.

According to the disclosure, the actuation unit (actuator) is embodied for navigating between the display regions and within each display region and for operating the apparatuses. In this way, a highly integrated operating system for a vehicle is provided, which can be uniformly actuated by the operator and is thus quickly learnable. This contributes to an ergonomic and safe operation of the apparatuses of the vehicle.

In one embodiment, the display device includes a plurality of organic light-emitting diodes (OLEDs) and/or thin-film transistors (TFTs), for example in the form of a transparent film that is bent at least once through an angle of exactly or substantially 180° to form at least two at least partially overlapping planar display regions. With appropriate electric control, OLED or TFT films themselves emit the light that is required to display information. Two or more planar display regions, which are arranged one behind the other with respect to the viewing direction of the viewer and are visible to them simultaneously, can be formed easily and cost-effectively using an at least partially transparent OLED film or TFT film. The scope of protection of the disclosure also encompasses further known or future display technologies that permit the formation of transparent films. Bending through an angle of exactly or substantially 180° can also be implemented in a multi-stage fashion, for example with two bending stages each through approximately 90°.

In an alternative embodiment, the display device includes at least two plane mirrors, which each form a display region and extend exactly or substantially parallel to one another. Frontward mirrors must of course be of semitransparent design so as not to block the view of the viewer onto rearward mirrors. The light that is emitted by a screen that the viewer cannot see can be reflected into the viewing direction of the viewer using the mirrors. Such mirrors are simple and cost-effective to produce and to handle.

In a further embodiment, the actuation unit extends through cutouts, which are provided in the display regions and are aligned with one another in the viewing direction, and is designed to be movable in actuation directions defined by the display device. In this way, it is achieved that the operating system is perceived by the operator as an integral unit and that the actuation unit can be actuated intuitively.

In other embodiments, the actuation unit is arranged at a distance from the display device, for example is integrated in a steering wheel of the vehicle or is provided in a region of the vehicle that lies adjacent to the steering wheel. In this way it is achieved that the operator actuating the operating device is not required to let go of the steering wheel or at least is not required to move their hand far from the steering wheel. This increases the safety of the vehicle during actuation of the operating device.

In an example embodiment, the actuation unit includes a rotary controller, which defines a rotation axis extending in the viewing direction and which is rotatable about the rotation axis and is displaceable in the direction of the rotation axis. Such a rotary controller permits setting of control variables, such as a volume or a target temperature, just as easily and intuitively as navigating between the display regions of the display device.

In an example embodiment, the rotation axis of the rotary controller is pivotable about at least one pivot axis extending transversely to the rotation axis, for example in a left-right direction and/or in an up-down direction. The pivotability of the rotary controller makes a simple and intuitive navigation within a specific display region of the display device possible.

In an embodiment, the actuation unit includes a touch sensor (touchpad). The touch sensor can be arranged on a front face of the actuation unit that faces the operator. For example, an apparatus function can be activated or deactivated particularly easily by repeatedly briefly tapping the touch sensor. Under prolonged contact with the touch sensor, possible values of a specific control variable can be proposed by running through them in a cycle and can be set in accordance with the current proposal upon letting go of the touch sensor.

In a further embodiment, the actuation unit includes a microphone and is configured to make actuation of the operating system by way of acoustically capturable commands, for example in the form of voice control, possible. The microphone is arranged and oriented in the vehicle such that it can capture acoustic statements of a particular operator or of a plurality of operators. In this configuration of the actuation unit, no manual action on the part of an operator is required. Accordingly, the driver of the vehicle is not required to remove their hand from the steering wheel to actuate apparatuses of the vehicle, thus decreasing the risk of the vehicle being involved in an accident.

In yet a further embodiment, the actuation unit includes a camera and is configured to make actuation of the operating system by way of optically capturable commands, for example in the form of gesture control, possible. The camera is arranged and oriented in the vehicle such that it can capture gestures of a particular operator or of a plurality of operators. Operating apparatus functions by gestures does not require the operator to change their viewing direction. Therefore, the driver of the vehicle can keep their gaze on the traffic events in the environment of the vehicle while actuating the operating system.

In an example embodiment, different function groups of the vehicle are arranged on different display regions of the display device. In other words, the information relating to the apparatus functions is functionally ordered in the third spatial dimension. Such an ordering can be particularly easily and quickly learned by the operator.

BRIEF DESCRIPTION OF THE DRAWINGS

These and other aspects and advantages will become more apparent and more readily appreciated from the following description of example embodiments, taken in conjunction with the accompanying drawings, of which:

FIG. 4 is a perspective front view of an illustration of a further embodiment of the operating system, according to an example, FIG. 5 is a perspective detail view of the operating system shown in FIG. 4.

DETAILED DESCRIPTION

Figure 1:
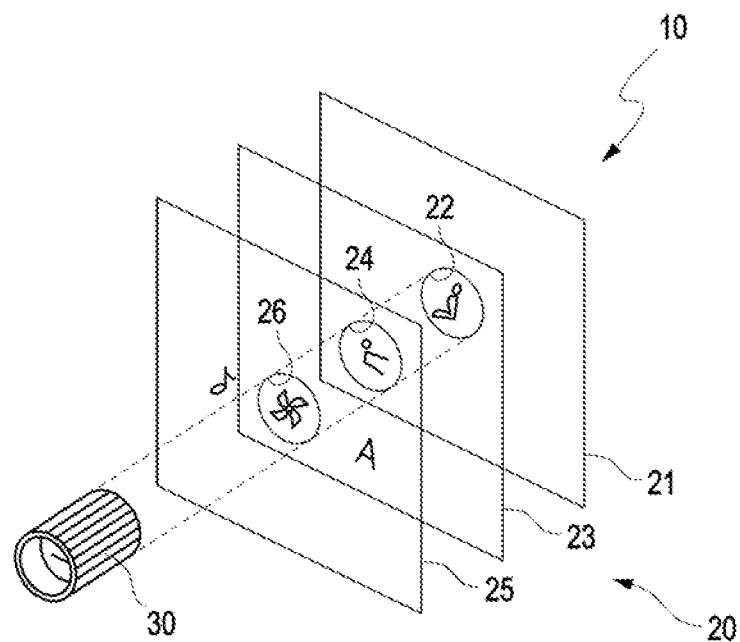
FIG. 1 is a perspective exploded view of a schematic illustration of an embodiment of the operating system, according to an example.

Reference will now be made in detail to examples which are illustrated in the accompanying drawings, wherein like reference numerals refer to like elements throughout.

FIG. 1 shows a perspective exploded view of a schematic illustration of an embodiment of the operating system according to an example. The operating system 10 is suitable for operating a plurality of apparatuses of a vehicle (not illustrated) and has a display device 20 with three planar display regions 21, 23, 25, which are arranged one behind the other in a viewing direction of an operator and extend transversely to the viewing direction. Function groups assigned to different apparatuses of the vehicle are arranged on different display regions 21, 23, 25 of the display device 20.

The display regions 21, 23, 25 are embodied in the form of three plane mirrors that extend parallel to one another. The frontward mirrors that are closer to the operator here have a semitransparent design so as not to block the view of the operator onto the rearward mirrors. Cutouts 22, 24, 26 that are aligned with one another in each case in the viewing direction are provided in the display regions 21, 23, 25.

The operating system 10 furthermore has an actuation unit 30, which extends through the cutouts 22, 24, 26. The actuation unit 30 is movable in actuation directions defined by the display device 20 and is embodied for navigating between the display regions 21, 23, 25 and within each display region 21, 23, 25 and for operating the apparatuses.

The actuation unit 30 includes a rotary controller, which defines a rotation axis extending in the viewing direction and which can be rotated about the rotation axis and displaced in the direction of the rotation axis through the cutouts 22, 24, 26. In addition, the rotation axis of the rotary controller is pivotable in a left-right direction and in an up-down direction about two mutually perpendicular pivot axes extending perpendicular to the rotation axis. The rotary controller has a plurality of latch positions for specific rotation angles. In addition, the rotary controller is embodied to differentiate between actuation by the driver and actuation by the front passenger.

The actuation unit 30 furthermore includes a touch sensor (touchpad), which is arranged on the front face of the rotary switch that faces the operator, a microphone (not illustrated) for capturing acoustic statements of the operator, and a camera (not illustrated) for capturing gestures of the operator.

During the operation of the operating system 10, information relating to operating states of apparatuses of the vehicle, which are connected to the operating system, are continuously displayed for the operator on the display regions 21, 23, 25 of the display device 20. To operate the apparatuses, the operator navigates between the display regions 21, 23, 25 by selectively sliding the rotary controller of the actuation unit 30 forward and backward in the cutouts 22, 24, 26. Within a selected display region 21, 23, 25, the operator can then, by way of appropriately pivoting the rotary controller, determine a desired function or a control variable of an apparatus by positioning a mark for setting purposes. A control variable is set by rotating the rotary controller about the rotation axis. In this case, the latch positions are assigned predetermined change steps of the control variable that is to be set (for example 0.5° C./latch position).

A function is switched on and off by touching the touch sensor, while a control variable is changed by twisting the rotary controller. Alternatively, the specific control variable can also be set by prolonged touching of the touch sensor, as a result of which a sequence of all possible values of the control variable is displayed automatically and cyclically, and by correspondingly letting the touch sensor go once the desired value of the control variable is displayed.

It is additionally possible to actuate the operating system 20 by way of the microphone or the camera through voice or gesture control.

Figure 2:
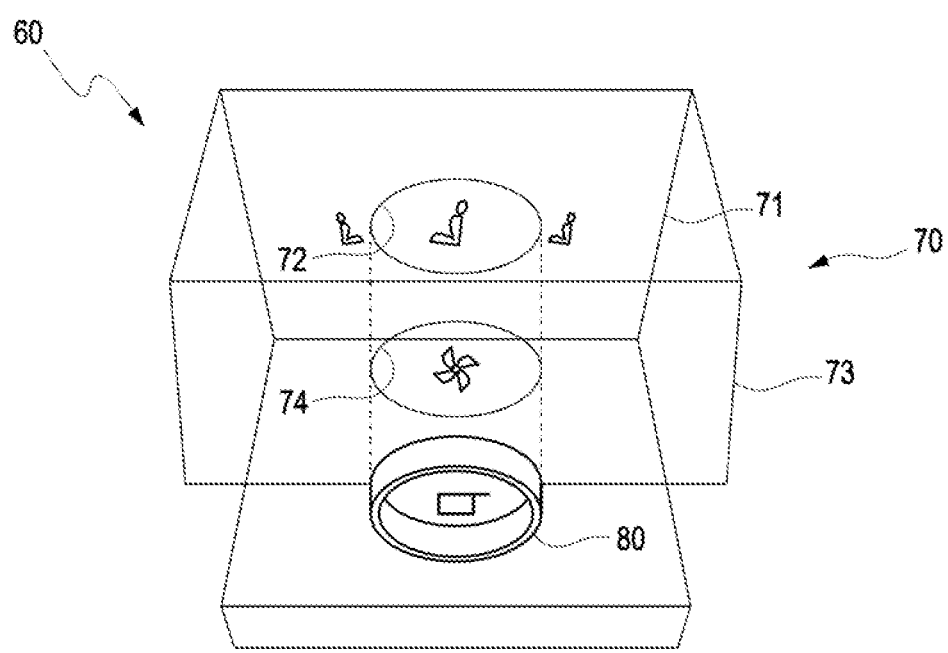
FIG. 2 is a perspective front view of a schematic illustration of a further embodiment of the operating system, according to an example.

FIG. 2 shows a perspective front view of a schematic illustration of a further embodiment of the operating system according to an example. The operating system 60 includes a display device 70 and an actuation unit 80 and differs from the operating system 20 illustrated in FIG. 1 in that the display device 70 includes a transparent OLED film, which is bent once through 180° and defines two overlapping planar display regions 71, 73 with cutouts 72, 74 provided therein.

Figure 3:
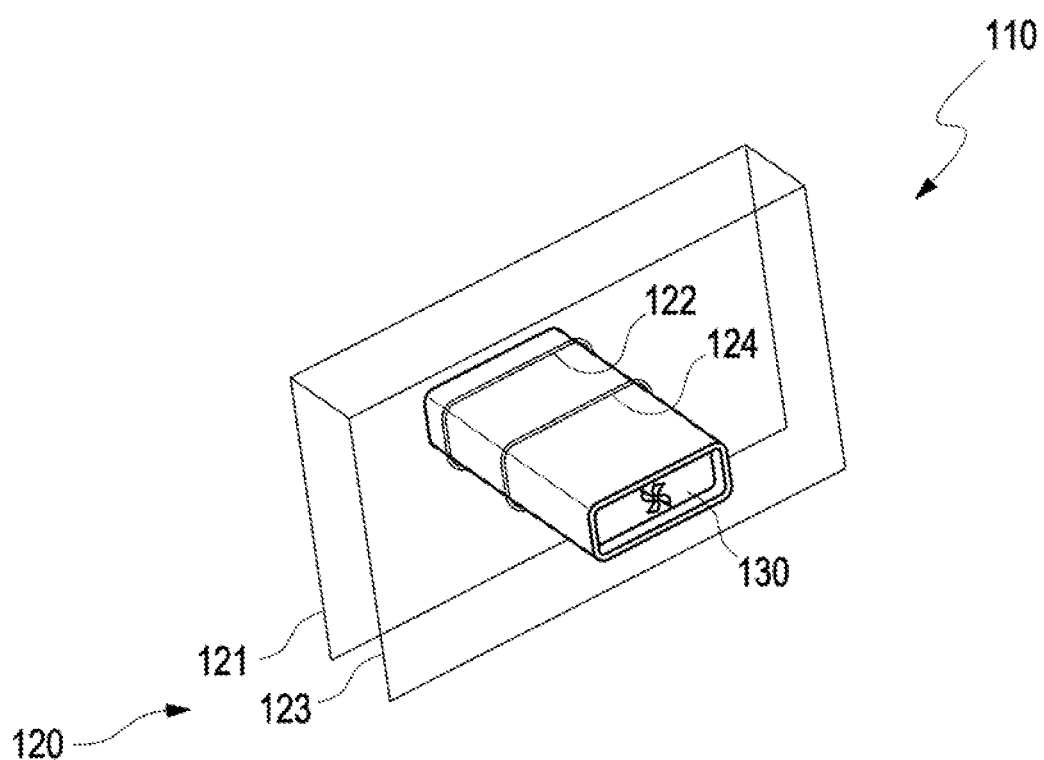
FIG. 3 is a perspective front view of a schematic illustration of a further embodiment of the operating system, according to an example.

FIG. 3 shows a perspective front view of a schematic illustration of a further embodiment of the operating system according to an example. The operating system 110 corresponds to the operating system 60 shown in FIG. 2 with respect to its principle construction and has a display device 120 with two display regions 121, 123, in which cutouts 122, 124 are provided, and an actuation unit 130 that is embodied in the form of a rotary controller. In contrast with the operating system 60, however, the rotary controller is not configured to be rotation-symmetric about the rotation axis, but has a substantially rectangular cross section with flattened corners. Accordingly, the rotary controller can be twisted only within a small angle range that is limited by the play in the cutouts 122, 124.

A specific control variable in this configuration of the rotary controller, for which the designation "toggle" is customary, is set by prolonged holding of an angular deflection to automatically display a sequence of all possible values of the control variable and letting go of the rotary controller as soon as a desired value for the control variable is displayed.

FIG. 4 shows a perspective front view of an illustration of a further embodiment of the operating system according to an example. The operating system 160 corresponds to the operating system 10 shown in FIG. 1 with respect to its principle construction and has a display device 170 with elongated display regions 171, 173, 175, in which cutouts 172, 174, 176 (see FIG. 5) are provided laterally, and an actuation unit 180 having a trapezoidal cross section. The operating system 160 serves the front passenger as a multimedia interface (MMi) of an infotainment system installed in the vehicle.

FIG. 5 shows an enlarged detail view of the actuation unit 180 of the operating system 160 illustrated in FIG. 4.

Figure 6:
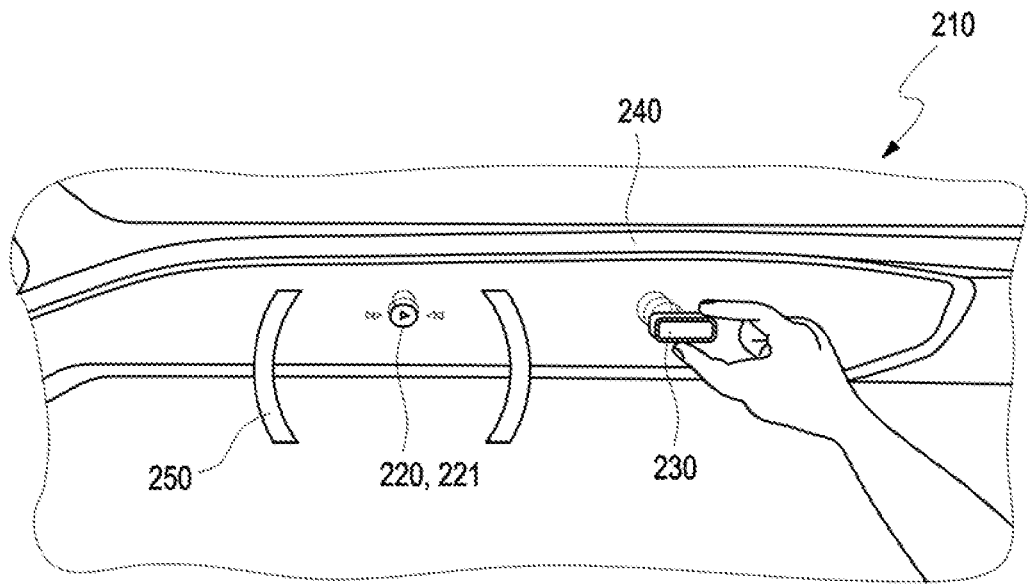
FIG. 6 is a perspective front view of an illustration of a further embodiment of the operating system, according to an example.

FIG. 6 shows a perspective front view of an illustration of a further embodiment of the operating system according to an example. The operating system 210 is closest in terms of its principle construction to the operating system 160 shown in FIGS. 4 and 5 and includes a display device 220 with three display regions, of which only the display region 221, which is closest to the viewer, is shown for clarity, and an actuation unit 230. The operating system 210 is arranged in the field of view of the driver on a dashboard 240, behind a steering wheel 250 of the vehicle, and allows the driver access to information and control variables relating for example to the engine or the route.

Figure 7:
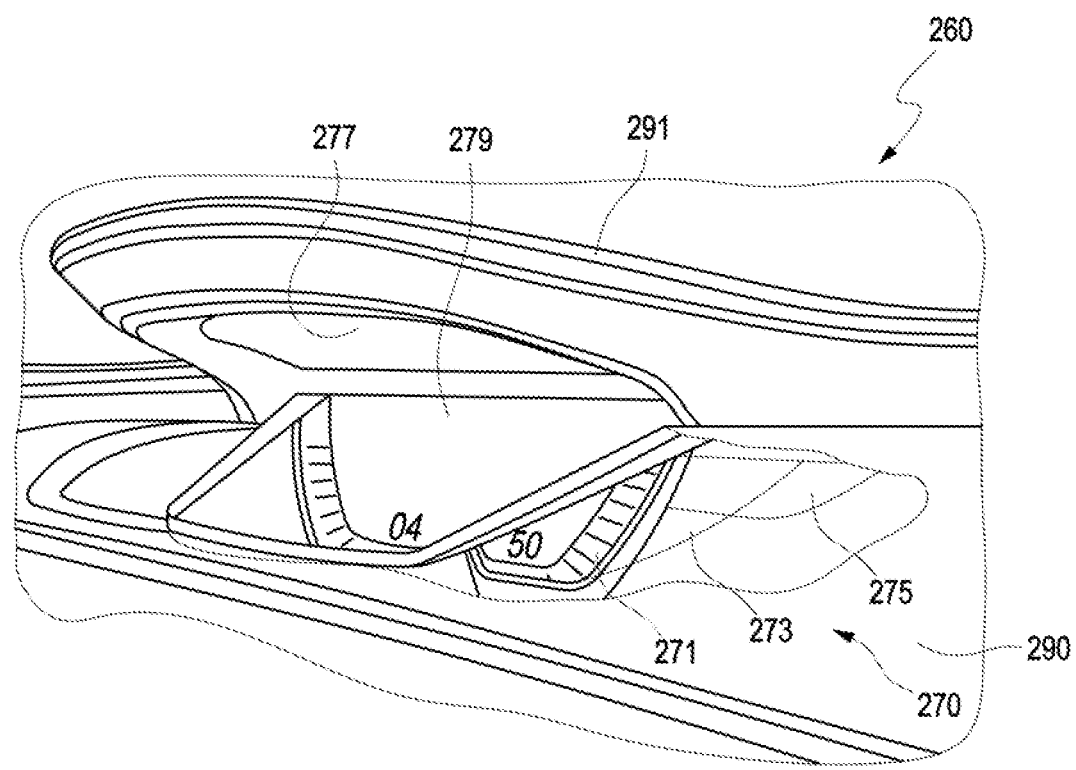
FIG. 7 is a perspective front view of an illustration of a further embodiment of the operating system, according to an example.

FIG. 7 shows a perspective front view of an illustration of a further embodiment of the operating system according to an example. The operating system 260 corresponds to the operating system 10 illustrated in FIG. 1 in terms of its principle construction. It includes a display device 270 with three display regions 271, 273, 275. The display regions 271, 273, 275 are arranged on the top side of a dashboard 290 of the vehicle and are protected against light incidence from the environment of the vehicle by a roof section 291, which projects upwardly at an angle from the dashboard 290 to the rear to avoid bothersome reflections. The emitted light of a first screen 277 arranged in the roof section 291 and of a second screen 279 arranged in the dashboard 290 is superposed using the display regions 271, 273, 275 in the form of mirrors and is reflected in the viewing direction of the viewer. The actuation unit, which is combined with the display device 270 and not illustrated in FIG. 7, can be integrated for example in a steering wheel or a door of the vehicle and include a microphone for voice control and/or a camera for gesture control.

The operating system described herein offers the advantage of making operation of the apparatuses of the vehicle more manageable. This is achieved by way of grouping apparatus functions together and distributing the function groups that have been formed over a plurality of display regions of the operating system. The viewer and operator of the operating system can focus their eyes onto a specific display region and consequently easily disregards further display regions that are located outside the region of sharp focus of their eyes. The distribution of the function groups over the display regions and the functions or control variables that are respectively represented on a display region can be quickly learned, similar to "shortcuts" on a keyboard, and, after the distribution has been learned, the operating system can be actuated without looking. A further advantage of the operating system described herein can be considered that the actuation unit can be actuated in accordance with ergonomic concepts such as "more," "less," "left," "right," and the like, which is accompanied by intuitive use of the operating system. Not least, the operating system described herein also impresses with a completely novel and fascinating interaction experience for the operator, resulting in the operator's increased appreciation for the vehicle and a stronger bond with the vehicle on the part of the operator.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. An operating system for a plurality of apparatuses of a vehicle, the operating system comprising:

a display device having at least two planar display regions arranged one behind the other in a viewing direction of an operator and which extend transversely to the viewing direction, the at least two planar display regions including respective cutouts which are aligned with one another in the viewing direction; and an actuator, extending through each of the cutouts provided in the at least two planar display regions, configured to navigate between the at least two planar display regions and within each of the at least two planar display regions, and to operate the plurality of apparatuses.

2. The operating system according to claim 1, wherein the display device includes a plurality of organic light-emitting diodes.

3. The operating system according to claim 2, wherein each of the plurality of organic light-emitting diodes include a transparent film bent at least once through an angle of 180° to form two planar display regions among the at least two planar display regions, and the two planar display regions formed by the bent transparent film at least partially overlap with one another.

4. The operating system according to claim 1, wherein the display device includes at least two plane mirrors, each of which form a planar display region among the at least two planar display regions, and the at least two plane mirrors are arranged in a parallel manner with respect to one another.

5. The operating system according to claim 1, wherein the actuator is configured to be movable in actuation directions defined by the display device.

6. The operating system according to claim 5, wherein the actuator includes a rotary controller rotatable about a rotation axis extending in the viewing direction and displaceable in a direction of the rotation axis.

7. The operating system according to claim 6, wherein the rotation axis of the rotary controller is pivotable about at least one pivot axis extending transversely to the rotation axis, in at least one of a horizontal direction or a vertical direction.

8. The operating system according to claim 5, wherein the actuator includes a touch sensor disposed on a front face of the rotary controller that faces the operator.

9. The operating system according to claim 5, wherein the actuator includes a microphone configured to control operations of the operating system by acoustically capturable commands.

10. The operating system according to claim 9, wherein the acoustically capturable commands include voice commands.

11. The operating system according to claim 5, wherein the actuator includes a camera to control operations of the operating system by optically capturable commands.

12. The operating system according to claim 11, wherein the optically capturable commands include gesture commands.

13. The operating system according to claim 1, wherein different function groups of the vehicle are arranged on different planar display regions among the at least two planar display regions.

14. The operating system according to claim 1, wherein the display device includes thin-film transistors formed of a transparent film bent at least once through an angle of 180° to form two planar display regions among the at least two planar display regions, and the two planar display regions formed by the bent transparent film at least partially overlap with one another.

15. The operating system according to claim 1, wherein
the vehicle includes a dashboard, and
  the operating system is provided on the dashboard.

16. The operating system according to claim 1, wherein
the vehicle includes a dashboard and a steering wheel, and
  the display device is provided on the dashboard, and
  the display device is provided behind the steering wheel.

17. The operating system according to claim 1, wherein
the actuator is configured to operate the plurality of apparatuses to control at least one of a climate setting, navigation setting, infotainment setting, or vehicle setting.

18. The operating system according to claim 1, wherein
  the actuator includes a touch sensor provided on a front face of the actuator that faces the operator,
  the touch sensor is configured to activate or deactivate a function of at least one of the plurality of apparatuses by the operator touching the touch sensor,
  the actuator is configured to rotate to set a control variable of at least one of the plurality of apparatuses, and
  the actuator is configured to navigate to a planar display region among the at least two planar display regions by displacement of the actuator in the viewing direction.

\* \* \* \* \*